Nov. 4, 1969    J. A. WILLOUGHBY    3,475,816
METHOD OF JOINING METAL MATERIALS HAVING
DIFFERENT CHARACTERISTICS
Filed Jan. 3, 1966
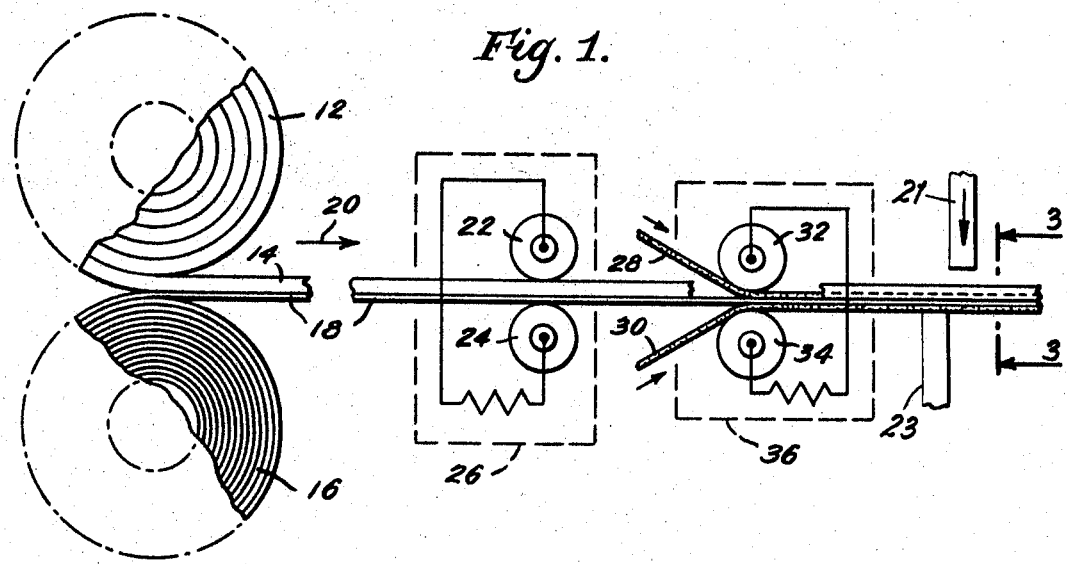
Fig. 1.
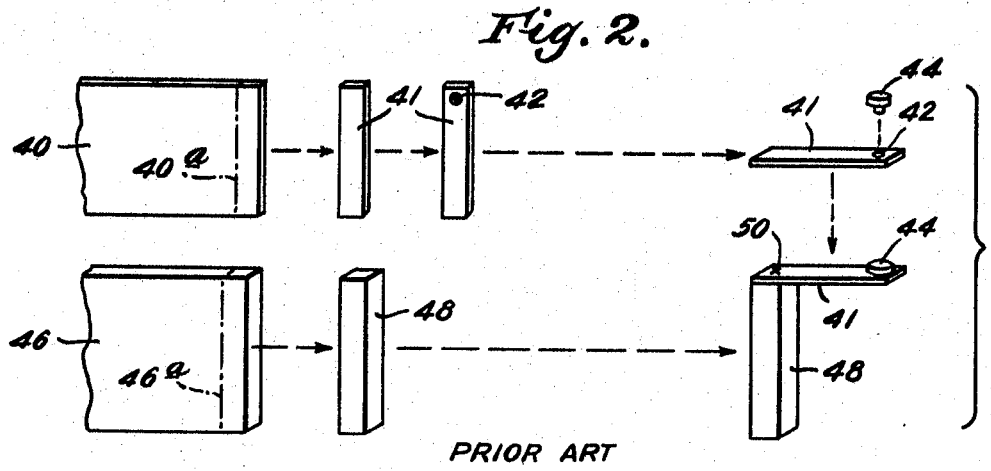
Fig. 2.
PRIOR ART
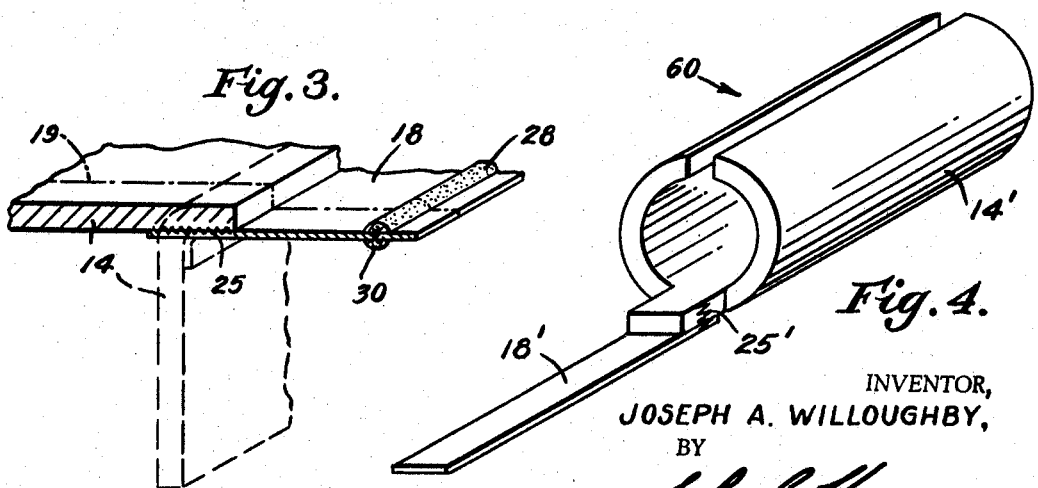
Fig. 3.
Fig. 4.
INVENTOR,
JOSEPH A. WILLOUGHBY,
BY
John C. Haug
ATT'Y.

United States Patent Office 3,475,816
Patented Nov. 4, 1969

3,475,816
METHOD OF JOINING METAL MATERIALS HAVING DIFFERENT CHARACTERISTICS
Joseph A. Willoughby, Attleboro, Mass., assignor to Texas Instruments Incorporated, Dallas, Tex., a corporation of Delaware
Filed Jan. 3, 1966, Ser. No. 518,256
Int. Cl. H01r 9/02
U.S. Cl. 29—630      1 Claim

ABSTRACT OF THE DISCLOSURE

A method for making electrical contact assemblies is shown to comprise the steps of continuously advancing strips of relatively stiff and relatively flexible metal materials along parallel paths which only partly overlap, continuously advancing at least one elongated strip of electrical contact material along a path parallel to the path of the flexible material to overlap a part of the path of the flexible material which does not overlap the path of the stiff material, continuously bonding overlapping portions of the stiff and flexible materials together as said materials are advanced along said partly overlapping paths, continuously bonding the contact material to the flexible material as said materials are advanced along said overlapping paths and cutting the resulting bonded material in a direction perpendicular to said paths for separating said bonded material into individual contact assemblies each embodying a relatively flexible portion which is bonded to and extends from a relatively stiff portion and which has a contact material bonded to a part of said flexible portion extending from said stiff portion.

---

This invention relates to methods for joining strips of materials together and products thereof, and more particularly, to joining strips of materials having different characteristics in a continuous process.

It has become increasingly important in recent years to produce parts at a minimum cost yet having precise measurements. These requirements tend to diverge rather than follow each other. The more precision required normally the higher the unit cost of the item.

On the other hand my invention not only results in a cost savings per unit but also results in more precise control of the dimensions thereof. Generally this is accomplished by eliminating or combining steps and reducing handling where possibilities of error were in the past introduced.

It is an object of my invention to provide a method for joining materials inexpensively but with extreme accuracy.

It is a further object to join materials having different characteristics useful as elements in various combinations.

It is a further object to produce articles of extreme precision and uniformity.

It is yet another object to provide a method for obtaining a high quality bond between strips of two different materials in a continuous process.

The invention accordingly comprises the elements and combinations of elements, steps and sequence of steps, features of construction and manipulation, and arrangements of parts, all of which will be exemplified in the structures and methods hereinafter described, and the scope of the application of which will be indicated in the appended claim.

In the accompanying drawings in which several of the various possible embodiments of the invention are illustrated:

FIG. 1 is a side elevational view, partly diagrammatic, showing the steps of the instant invention;
FIG. 2 shows the sequence of steps in the production of a prior art device;
FIG. 3 is a cross-sectional view taken on line 3—3 of FIG. 1; and
FIG. 4 shows an article made in accordance with the invention.

Similar reference characters indicate corresponding parts throughout the several views of the drawings.

Dimensions of certain of the parts as shown in the drawings may have been modified and/or exaggerated for the purposes of clarity of illustration.

In the past assemblies composed of materials having different characteristics to meet specific design requirements have been produced in various ways. Where the only difference relates to dimensions the assemblies can be machined, forged, cast and the like. However when the pieces are composed of different materials to fit the particular design requirement, such as combining a thin flexible piece of spring material to a heavier terminal member the possibilities are more limited. Generally, in the past, the pieces have been cut to size and fastened together as by welding. Such a method is shown in FIG. 2 where a thin web 40 is cut as at 40a into strips 41, a contact receiving aperture 42 is then punched therein and rivet 44 is attached. A relatively thick web 46 is cut as at 46a into strips 48. A strip 41 is then attached as by welding to a strip 48 as at 50. Not only did this require a great deal of handling with attendant opportunities for error but the process was inherently expensive due to the difficulty in handling the parts which generally were of very small size. Further the sequence of steps required a large amount of handling. Due to these factors there were of necessity a relatively large proportion of rejects.

Attempts have been made to butt weld two strips of different material together in edge to edge relation, however this has not proven to be satisfactory. The welding results in a hardening of the strips adjacent the weld as well as creating an "oil can" or rippling effect. This is unsatisfactory for precision parts as well as being relatively expensive to produce.

My invention involves partially overlapping lapping one strip of material over another and seam welding with a continuous rotary welder the overlapped portions. The welding heat is thereby largely confined to the heavier portion thus avoiding the "oil can" effect.

More specifically, as seen in FIG. 1, a relatively stiff and heavy gauge material 14 such as brass is continuously advanced from a supply 12 and a relatively flexible and light gauge material 18 such as beryllium copper or other copper is continuously advanced from a supply 16, the materials 14 and 18 being guided along parallel paths in the direction of arrow 20 so that the edges of the materials 14 and 18 overlap. This overlapping is best seen in solid lines in FIG. 3. The overlapped portions of the materials 14 and 18 are then guided between rotary electrodes 22, 24 in a conventional welding station 26, as illustrated in FIG. 1, to continuously bond the overlapping portions of the materials 14 and 18 together by means of a continuous weld indicated at 25 in FIG. 3 so that the material 18 extends from the material 14 as illustrated in FIG. 3.

Station 26 may also include an analog computer, conventional per se, to continuously monitor the weld. This provides accurate control of the weld quality so that a consistent standard having very little tolerance can be maintained among the articles produced. The overlapped portions of the materials 14 and 18 having been welded together, the bonded strips may be further processed by bonding contact strips 28, 30, (e.g. by welding) to the extending portions of the materials 18 by means of electrodes 32, 34 at station 36. That is, contact material strips 28 and 30 are advanced along a path which is parallel to the path of the material 18 to overlap the part of the path of the material 18 which does not overlap the path of the material 14, as is illustrated in FIGS. 1 and 3. The contact material strips 28 and 30 are then welded to the extending portion of the material 18 at the station 36.

FIGURE 3 shows the product of FIG. 1 with a continuous weld 25. This product is cut by any conventional means such as are diagrammatically illustrated at 21 and 23 in FIG. 1 into separate strips perpendicular to the direction of the paths of the strip materials 14, 18, 28 and 30 as is illustrated at 19 in FIG. 3. In this way each cut strip forms a contact assembly having portions of the desired thickness as illustrated in FIG. 3 and may be bent in any conventional manner to produce the finished article, in this example an article corresponding to the prior art article of FIG. 2. As illustrated in FIG. 3, each cut strip of the bonded material embodys a relatively flexible portion which is bonded to and extends from a relatively stiff portion and which has contact portions bonded to the extending portion of the flexible portion, the bonds between the stiff and flexible portions of the cut strip and between the contact materials and the flexible portion of the cut strip extending across the width of the cut strip. The article produced by my method not only has a lower per unit cost but also is of better quality and can be produced within closer tolerances. The critical distances, such as the distance from the vertical leg 14 to the contact strips 28, 30, can be controlled with great accuracy due to the continuous nature of the operation and elimination of separate handling of individual parts, jigs and so on which were required in producing the FIG. 2 article.

FIG. 4 shows another article produced in accordance with my method. Article 60 is composed of a relatively thick strip 14' seam bonded in overlapped relation at 25' to a relatively thin flexible member 18'. The parts are then cut and bent into the desired configuration.

It will be seen that articles can be produced in accordance with my invention which can be closely monitored to display very uniform and precise characteristics. Handling of individual small parts is completely eliminated until the finished parts are produced. Therefore chances for errors occurring are significantly reduced, as is the cost per part. Due to the ability to monitor the weld a very consistent bond is achieved. As seen in FIG. 3, when strip 14 is bent the flexibility of strip 18 is unaffected.

In view of the above it will be seen that the several objects of the invention are achieved and other advantageous results attained.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As many changes could be made in the above constructions without departing from the scope of the invention, it is intended that all matter contained in the above description or shown in the accompanying drawings, shall be interpreted as illustrative and not in a limiting sense.

I claim:

1. A method for making electrical contact assemblies comprising the steps of continuously advancing a strip of relatively stiff metal material and a strip of relatively flexible metal material along parallel paths which only partly overlap, continuously advancing at least one strip of electrical contact material along a path parallel to the path of the flexible material to overlap a part of the path of the flexible material which does not overlap the path of the stiff material, continuously bonding overlapping portions of the stiff and flexible materials together as said materials are advanced along said partly overlapping paths, continuously bonding the contact material to the flexible material as said materials are advanced along said overlapping paths, and cutting the resulting bonded material in a direction perpendicular to said path for separating said composite material into individual contact assemblies each embodying a relatively flexible portion which is bonded to and extends from a relatively stiff portion and which has a contact material bonded to a part of said flexible portion which extends from said stiff portion.

References Cited

UNITED STATES PATENTS

| 1,610,134 | 12/1926 | Jones | 156—157 |
|---|---|---|---|
| 2,774,858 | 12/1956 | Heilshorn | 219—117 |
| 3,095,500 | 6/1963 | Jost | 219—117 |

HAROLD ANSHER, Primary Examiner

J. C. GIL, Assistant Examiner

U.S. Cl. X.R.

29—481; 156—157, 522; 113—119; 219—83, 117